Figure 1:
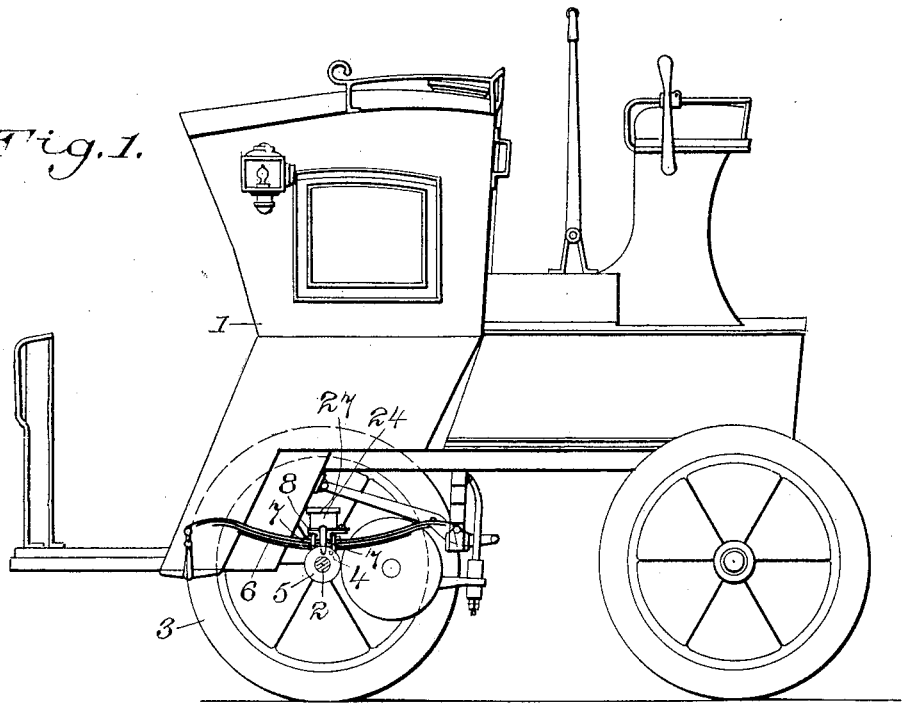

No. 665,443. Patented Jan. 8, 1901.
J. A. KEYES.
CYCLOMETER.
(Application filed Feb. 26, 1900.)

(No Model.) 3 Sheets—Sheet 1.

WITNESSES:

INVENTOR
James A. Keyes.
BY
Frankland James,
ATTORNEY

No. 665,443.  
J. A. KEYES.  
CYCLOMETER.  
(Application filed Feb. 26, 1900.)  
Patented Jan. 8, 1901.

(No Model.)

3 Sheets—Sheet 2.

WITNESSES:

INVENTOR  
James A. Keyes.  
BY  
Frankland Jannus  
ATTORNEY

No. 665,443. Patented Jan. 8, 1901.
J. A. KEYES.
CYCLOMETER.
(Application filed Feb. 26, 1900.)
(No Model.) 3 Sheets—Sheet 3.
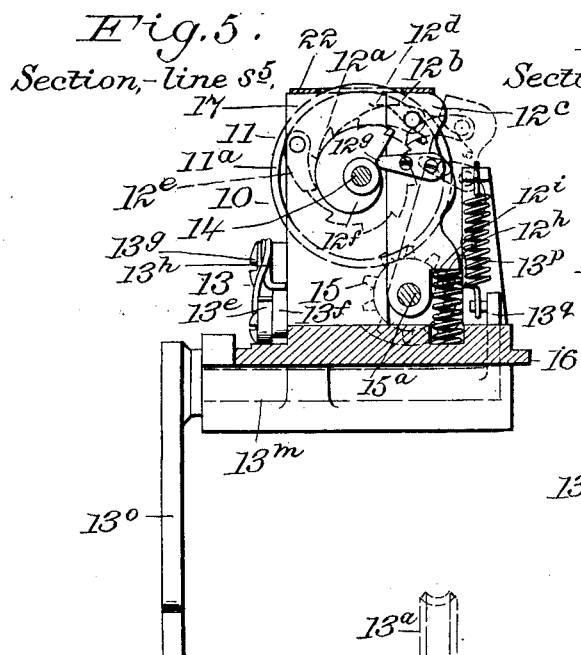
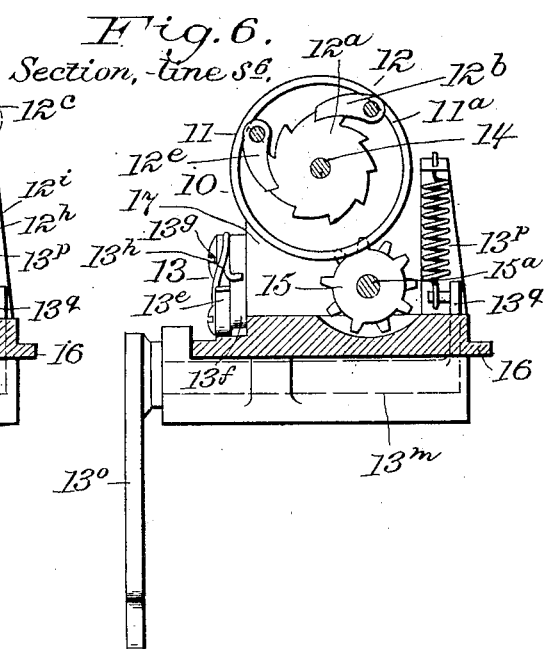
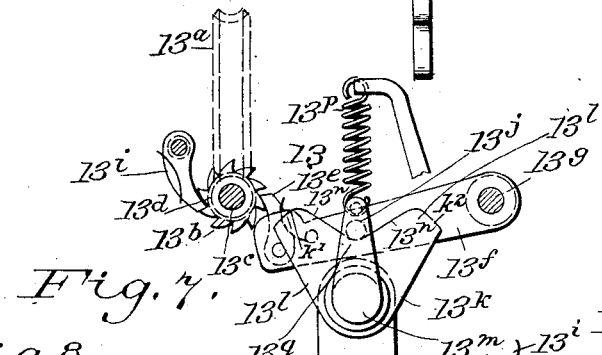
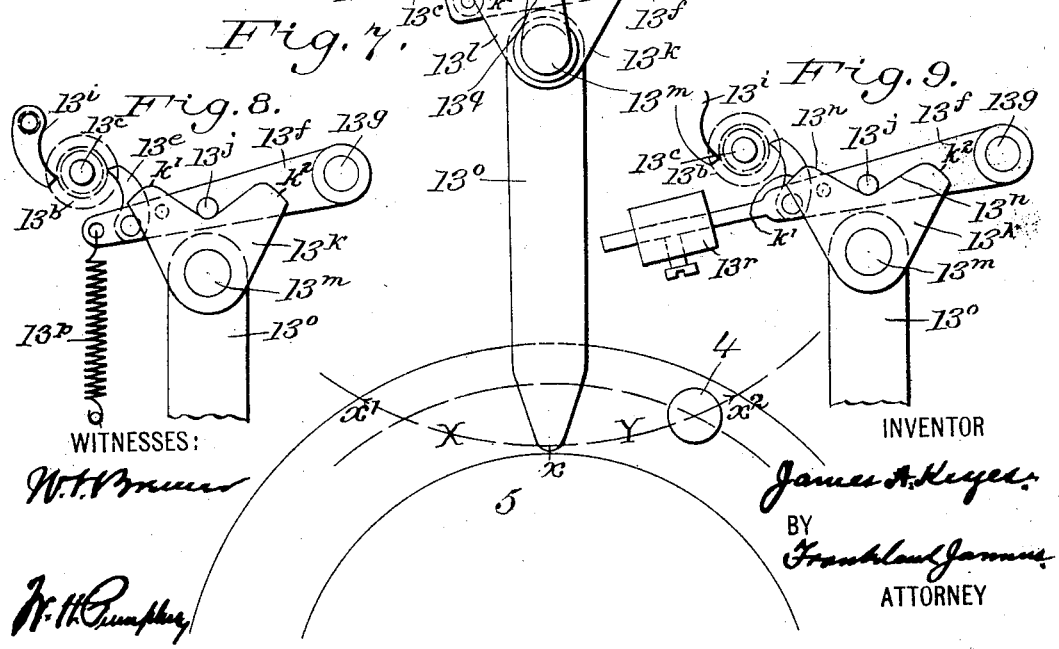
WITNESSES:
INVENTOR
James A. Keyes,
BY
Frankland James
ATTORNEY

UNITED STATES PATENT OFFICE.

JAMES A. KEYES, OF NEW YORK, N. Y.

CYCLOMETER.

SPECIFICATION forming part of Letters Patent No. 665,443, dated January 8, 1901.

Application filed February 26, 1900. Serial No. 6,461. (No model.)

*To all whom it may concern:*

Be it known that I, JAMES A. KEYES, a citizen of the United States of America, and a resident of New York, county of New York, State of New York, (post-office address at No. 656 Hudson street, New York, N. Y.,) have invented certain new and useful Improvements in Cyclometers, (Case B,) of which the following is a specification.

My invention relates generally to cyclometers, and is capable of use for all purposes for which such devices are or may be employed. In the present embodiment, however, I have shown the instrument as designed for use in connection with the larger class of vehicles which may be power-driven and in which one of the axles, the wheels thereon, and the body-supporting springs are in fixed relation.

The novelty of the invention lies, broadly, in the means employed for transmitting motion from the vehicle-wheel when rotating in either direction to the registering mechanism and causing the latter to respond by totalizing and indicating the entire distance traveled.

An important feature of the invention consists in the employment of a self-centering arm for coöperation with a vehicle-wheel projection and a double-acting cam actuated by the arm, whereby either the forward or the rearward travel of the vehicle will be registered, thereby preventing the cancellation of registered mileage by running the vehicle rear end foremost, as would be possible with a positively-connected mechanism.

The invention in its preferred form is illustrated in the accompanying drawings, throughout the several views of which like reference characters indicate corresponding parts.

Figure 2:
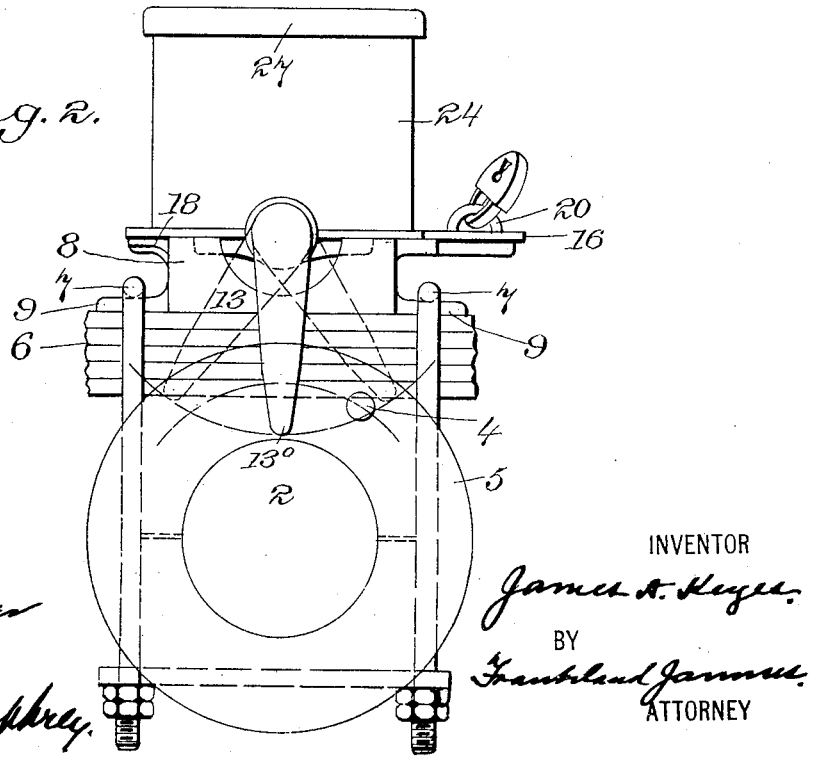
Figure 3:
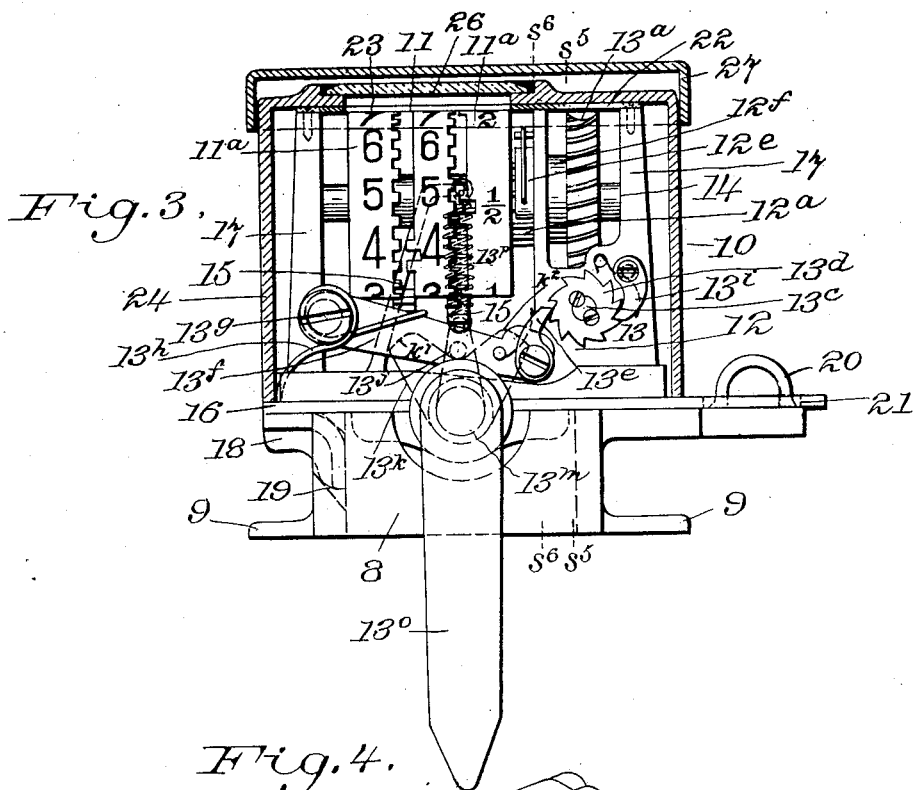
Figure 4:
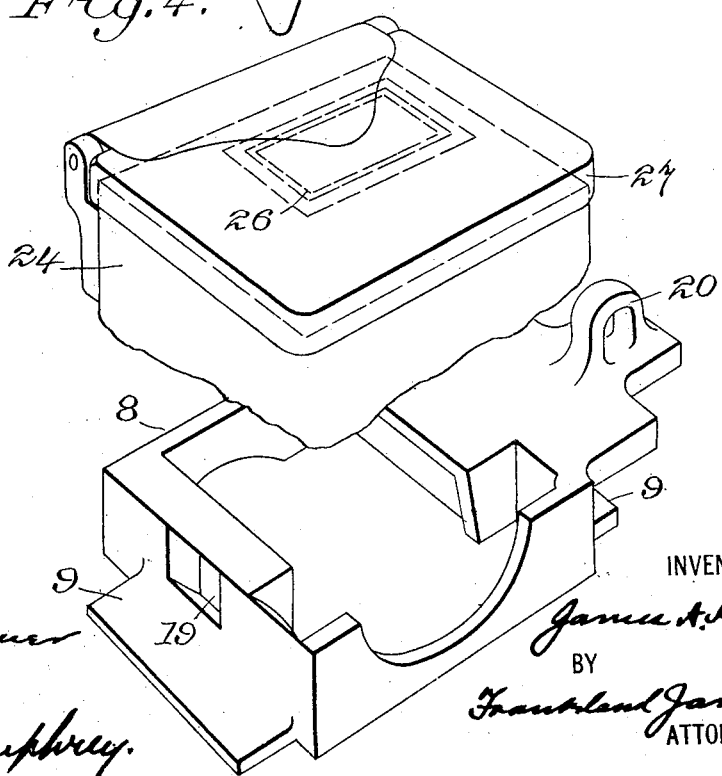

Referring to the drawings, Figure 1 is a view in elevation of an electrically-driven vehicle known as an "automobile," showing the cyclometer applied thereto, one of the forward wheels being removed to more clearly illustrate the relative arrangement of parts. Fig. 2 is an enlarged view in detail, illustrating the manner of mounting the cyclometer upon the axle of the vehicle. Fig. 3 is a view showing the cyclometer mechanism in elevation and the upper cap or casing thereof in section. Fig. 4 is a view in perspective of the detachable base and the upper portion of the cap or casing. Fig. 5 is a sectional view taken on the line $s^5$ $s^5$ of Fig. 3 and showing the cyclometer removed from its base and casing. Fig. 6 is a similar view taken on the line $s^6$ $s^6$ of Fig. 3. Fig. 7 is a view in diagram, illustrating the operation of the self-centering arm and the relation of other parts of the gearing which connect the ratchet-feed with the vehicle. Fig. 8 is a view in detail, showing a modified application of the centering-spring. Fig. 9 is a view similar to Fig. 8, in which the weight is substituted for the spring.

In the drawings, 1 represents a power-driven vehicle of the class known as "automobiles."

2 represents the axle, and 3 the wheels thereon.

4 represents a stud or projection which is mounted upon the hub 5 of the wheel.

6 represents one of the vehicle-springs in fixed relation to the axle-wheel, &c., and through the medium of which the body is connected to and supported upon the running-gear, the fastenings employed for the springs being the well-known form of clip-bolts 7.

8 represents a base-plate, shown and claimed in a separate concurrent application, to which the cyclometer is designed to be detachably secured; but this feature is not essential to those herein claimed, and the cyclometer may be secured in position by bolts or screws in any known way. This plate is provided at opposite ends with lugs 9 9 of a form suitable for taking under the clip-bolts above referred to, by which they are clamped, and thus secured the base becomes practically a fixture and serves at all times to provide a seat for mounting a cyclometer.

10 represents the cyclometer, which comprises a registering mechanism 11, a ratchet-feed device 12, and gearing 13, connecting the feed with the vehicle-wheel.

The register 11 may be of any suitable or well-known form and employ any number of indicating drums or wheels $11^a$. In the present instance, however, three wheels are shown loosely mounted upon a through-shaft 14. The wheel to the right is peripherally marked at four equispaced points with "$\frac{1}{4}$," "$\frac{1}{2}$," "$\frac{3}{4}$," "1,"

"1½," and "2" and designed to register half-miles at each quarter-revolution. The central or intermediate wheel is peripherally marked from "1" to "10," inclusive, and serves to register units—i. e., miles. The wheel to the left of the series is also marked from "1" to "10," inclusive, and registers tens. The adjoining edges of the rims of these wheels are suitably notched or toothed and through coinciding notches are operatively connected by transfer-gearing 15 in a well-known manner to indicate addition from zero up to one hundred miles.

The feed for the register comprises a ratchet-wheel $12^a$, which is keyed or otherwise fixed to rotate with the register-wheel to the right of the series. The ratchet is advanced step by step through a pawl $12^b$, carried by a rocker-arm $12^c$, which latter is mounted loosely upon the shaft $15^a$, carrying the transfer-gearing of the register. The feed-pawl is sustained in operative relation to the ratchet by a spring $12^d$, and back play of the ratchet is prevented by the locking-pawl $12^e$. The rocker-arm is oscillated by a cam $12^f$, loosely mounted upon shaft 14 and acting upon a fixed stud or projection $12^g$ thereof, and is retracted by means of a spring $12^h$, acting against a projecting heel $12^i$ thereof, as is best shown in Fig. 5.

The gearing connecting the ratchet-feed with the vehicle comprises the worm-gear $13^a$, which is loose on shaft 14 and is keyed or otherwise secured to cam $12^f$, so that the gear and cam rotate together. The gear $13^a$ meshes with and is driven by a worm $13^b$, fixed on and rotating with shaft $13^c$, which latter has also mounted upon its outer end a ratchet $13^d$. This ratchet is advanced by a spring-pressed pawl $13^e$, carried by an arm $13^f$, which is pivoted at $13^g$ and sustained normally in a retracted position by a spring $13^h$. Back play of the ratchet is prevented by a spring-pressed locking-pawl $13^i$, which engages it continuously and limits its movement to rotation in one direction. The arm $13^f$ is provided with a projection or stud $13^j$ and is elevated against the action of its spring by a double-acting cam $13^k$ to cause the dog to advance the ratchet. The cam consists, essentially, of a notch or concavity approximately V-shaped and formed between diverging projections $13^l$ $13^l$ from shaft $13^m$, which provide oppositely-inclined cam-faces $13^n$ $13^n$, upon which the stud or projection $13^j$ travels when the cyclometer is registering.

In order to afford latitude of adjustment between the cyclometer and its motor device, the double-acting cam is so proportioned that its angular portions will raise the pin and lever the required distance to effect the results of registration by turning the ratchet-wheel until the next tooth is engaged, but that if moved a short distance farther than necessary to accomplish this result said pin will not be raised sufficiently to make further registration, but will travel more or less over the ends $k'$ $k^2$ of the cam $13^k$, which are sloped off to form non-registering extensions, which may move under the pin without raising it enough to move the ratchet to the next tooth. By this means if the actuating-arm be moved an inch beyond the point necessary for registration no damage will be done to the apparatus nor will any false registration be made, and this I find of great advantage in applying the cyclometer to various vehicles, and, moreover, this latitude of movement of the actuating-arm would also permit the correct operation of the cyclometer in many instances when partially dislodged from its desired position.

Upon the outer end of the cam-shaft a crank-arm $13^o$ is fixed and is engaged by a stud or projection 4 upon the hub of the vehicle-wheel, and is thereby oscillated during either the forward or backward travel of the vehicle.

Referring to Fig. 7, the crank-arm is shown in its normal position, where it is sustained by a centering-spring $13^p$, engaging a short arm $13^q$ of the cam-shaft. The spring $13^p$ may be otherwise located—as, for instance, as shown in Fig. 8, where it is attached directly to the arm $13^f$. In some instances also a weight $13^r$ may be connected with the arm $13^f$ as a substitute for the centering-spring. When the vehicle is traveling forward, the arm oscillates in the arc X between points $x$ $x'$ and during the travel toward the rear the arm swings in the arc Y between points $x$ $x^2$. This movement of the crank-arm is effected by the action of the pin or projection 4, as above referred to.

The mechanism of the cyclometer is mounted upon a plate 16, from which a series of uprights 17 17 17 rise to provide bearings for the several shafts mentioned. This plate conforms substantially in outline to the upper surface of the detachable base and is provided with a curved lug 18, which enters an inclined socket or opening 19 of the base and forms a hinge connection which is detachable only when the fastening at the opposite end of the plate is disengaged. This fastening comprises an integral staple 20, projecting from the base and upward through an opening 21, formed in the plate, which latter is secured, preferably, by a padlock engaging the staple.

22 represents a plate which is apertured at 23 to expose in a line one number of each disk.

The entire cyclometer mechanism is inclosed by a casing 24, which is detachably secured to the plate 16 and is provided with a glazed sight-opening 26, coinciding with the aperture in plate 22, and also with a hinged spring-closing cover 27, which on being swung back in opposition to the spring gives access to the sight-opening, through which the distance indicated by the register is exposed and may be read.

The operation is as follows: The cyclometer is placed in position upon its base by first entering the curved lug in the inclined opening of the base and then swinging the plate about the joint thus formed as a pivot until it rests upon the base, with the staple projecting through the aperture thereof. Assuming that the casing is properly secured to inclose the mechanism, it only remains to place the lock in position to engage the staple. Thus secured on the forward or rearward travel of the vehicle the crank-arm will be oscillated and through the double cam transmit a corresponding movement to the spring-retracted pawl-carrying arm, causing the pawl to advance the ratchet, which in turn actuates the worm-gearing, and through the cam in part therewith the feed-pawl is caused to periodically advance the ratchet of the first or right-hand wheel of the series. From this wheel motion is imparted at regulated intervals through the transfer-gearing to the next wheels of higher order to indicate addition, as previously stated. These register-wheels are limited to rotate in only one direction by the locking-pawl engaging the ratchet of the first disk of the series.

I do not herein broadly claim the main combinations, as the same constitute the subject-matter of an application filed of even date herewith.

It will be understood that I do not wish to limit myself to the exact construction and relation of parts as herein illustrated and described, as various changes might be made in the details or the general arrangement, or mechanical equivalents might be substituted for one or more parts here employed, and in adapting such equivalents for use in connection with the present mechanism more or less rearrangement or reconstruction may be required; but I consider all such changes as immaterial modifications and entirely within the scope of my invention.

Having therefore described the invention, I claim—

1. The combination with the vehicle-wheel and the engaging projection thereon, of a cyclometer mounted in fixed relation to the wheel, a cyclometer-actuating arm self-centering and operatively arranged to the engaging projection and a double-acting cam interposed between the cyclometer and its actuating-arm, each part of said cam formed with non-registering extensions, whereby the actuating-arm may be moved beyond the normal without false registration.

2. The combination with the vehicle-wheel and the engaging projection thereon, of a cyclometer mounted in fixed relation to the wheel, a crank-shaft, a crank-arm on the shaft arranged in operative relation to the wheel projection, a spring for maintaining the arm centered, a ratchet-feed device and a double-acting cam carried by the crank-shaft for actuating the feed.

3. The combination with a vehicle-wheel and an engaging projection thereon, of a cyclometer mounted in fixed relation to the wheel, a cyclometer-actuating arm operatively arranged to the engaging projection, a spring for centering the arm, a double-acting cam interposed between the cyclometer and its actuating-arm and means for preventing false registration upon an abnormal travel of the arm.

4. The combination with a vehicle-wheel, an engaging projection thereon, of a cyclometer mounted in fixed relation to the wheel, a cyclometer-arm self-centering and operatively arranged to the engaging projection, a double-acting cam interposed between the cyclometer and its actuating-arm, each part of said cam formed with non-registering extensions whereby false registration is prevented when the actuating-arm is moved beyond its normal travel.

Signed by me at New York, N. Y., this 24th day of February, 1900.

JAMES A. KEYES.

Witnesses:
W. V. BREMER,
FRANKLAND JANNUS.